Sept. 2, 1952  C. H. GEMMILL  2,609,525
ELECTRICALLY DRIVEN PORTABLE APPLIANCE
Filed Aug. 2, 1950
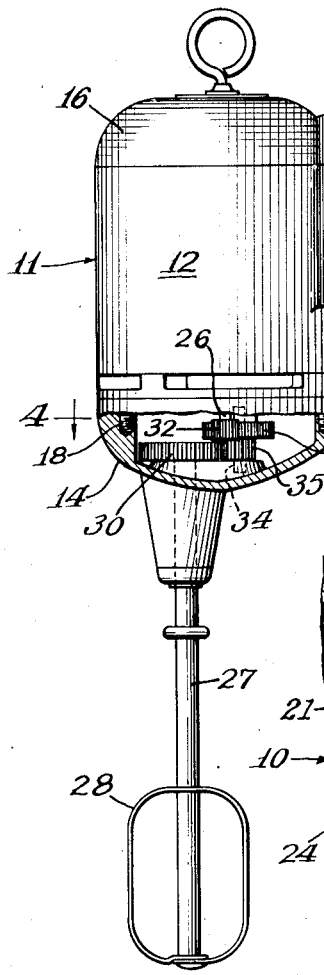
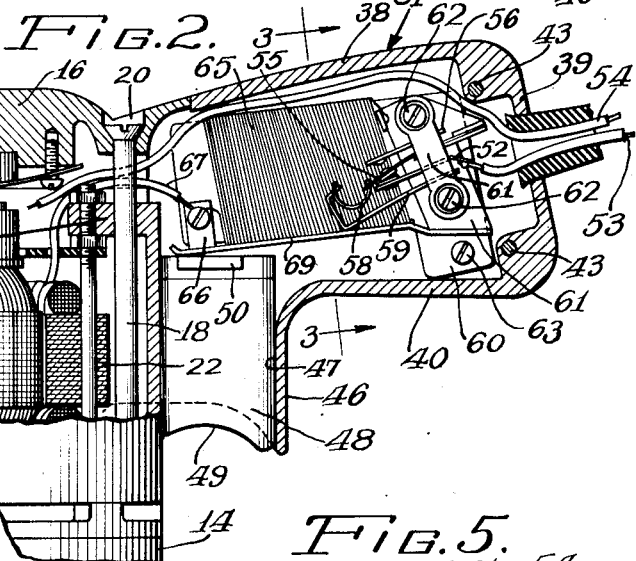
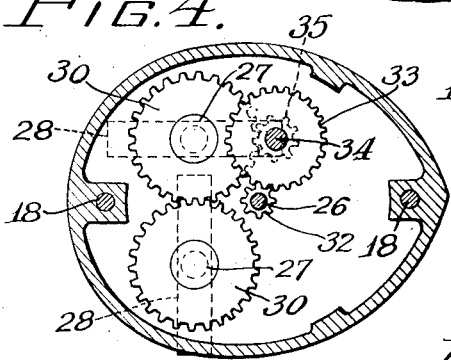
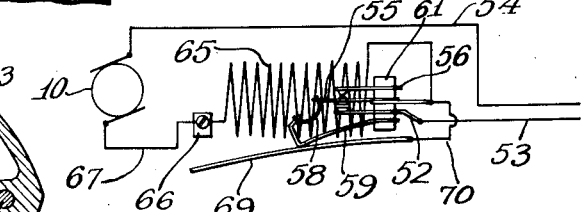
Inventor:
Clark H. Gemmill
By Fred Gerlach
his Atty.

Patented Sept. 2, 1952

2,609,525

UNITED STATES PATENT OFFICE 2,609,525

ELECTRICALLY DRIVEN PORTABLE APPLIANCE

Clark H. Gemmill, Chicago, Ill.; City National Bank and Trust Company administrator of said Clark H. Gemmill, deceased Application August 2, 1950, Serial No. 177,246

3 Claims. (Cl. 318—349)

The invention relates to electrically operated appliances, including a driven rotary tool, such for example as a food mixer element, which is adapted to be grasped in the palm of a hand and manually maneuvered during operation.

One object of the invention is to provide an appliance of this character which is provided with a finger-piece operable by a finger of the hand of the operator which controls the starting and stopping of the electric motor and also controls variation of the speed of the motor, while the appliance is being manually maneuvered in connection with its work.

Another object of the invention is to provide an appliance of this type which includes a pistol grip projecting from one side of the motor-housing and a finger-piece for controlling the motor which can be conveniently manipulated while the appliance is maneuvered in connection with the work.

Another object of the invention is to provide an appliance of this character which is simple in construction, efficient in operation, and can be economically fabricated.

Other objects will appear from the detailed description.

The invention consists in the several novel features which are hereinafter set forth and are more particularly defined by claims at the conclusion hereof.

In the drawings:

Fig. 1 is a side elevation of a food mixer embodying the invention, one of the sides of the pistol grip being removed and a portion of the motor-housing being shown in section;

Fig. 2 is a vertical section taken through the grip and the adjacent portion of the motor-housing;

Fig. 3 is a section taken on line 3—3 of Fig. 2;

Fig. 4 is a section taken on line 4—4 of Fig. 1;

Fig. 5 is a diagram of the electric circuits, the electric motor and switch connections.

The invention is exemplified in an appliance comprising: an electric motor, generally designated 10, a frame or housing for the motor generally designated 11, and a pistol grip for supporting and manipulating the driven elements in a bowl containing materials to be mixed. The housing 11 comprises a hollow body 12 generally elliptic in horizontal cross-section, a cup-shaped base section 14, and a cup-shaped top section or cap 16. The top section 16 and bottom section 14 fit the upper and lower ends of the body 12 and are clamped to said body by screws 18 which have their heads seated in sockets 20 in top section 16, extend through lugs 21 in body 12, and are provided with screw threads at their lower ends, which engage screw threaded sockets in bottom section 14. The electric motor including a stator 22, and a rotor 24 with a depending shaft 26, is enclosed in the housing 11. A pair of parallel depending shafts 27 are journalled in the bearings in the lower section 14 of the housing 11. Each shaft 27 is provided with a mixing element 28 adapted to be inserted and held in material to be mixed in a bowl. Elements 28 are each in the form of a loop and are mounted on said shafts in planes at a right angle to each other so as to rotate in interseating rotary zones. Intermeshing gears 30 are fixed to the upper ends of shafts 27 respectively for rotating the shafts in opposite directions. A pinion 32 on the motor shaft 26 meshes with a gear 33 on a counter shaft 34 and a pinion 35 rotatable with gear 33, meshes with one of the gears 30 for driving the shafts 27 and the mixing element 28 from the shaft 26 of the electric motor. Each shaft 27 with its attached element 28 exemplifies a rotary implement or tool which is adapted to be driven by and proportionately to the speed of the shaft 26 of the motor.

A pistol-grip handle 31 projects from one side and the upper end of the body 12 of the motor housing 11, and is adapted to be grasped in the palm of a hand. As shown, the handle 31 is formed as a hollow shell which defines an internal control compartment disposed immediately within the hand grip of the handle. Structurally, the handle 31 comprises a rim which is composed of a top member 38, an end member 39 and a bottom member 40 all integral with the body 12 of the housing 11, and side plates 41 and 42 secured by screws 43 to said rim. Adjacent the body 12 of the housing 11 the handle 31 is provided with an integral downward wall extension 46 which defines a slideway 47 which is open at its upper and lower ends for a finger-piece trigger 48, the lower end of which is provided with a concavely curved finger seat 49. Normally, the lower end of finger-piece 48 extends below extension 46 to permit said piece to be moved upwardly in the slideway in the grip. A shoulder 50 on the upper end finger-piece 48 is adapted to engage the sides of the slideway 47 for limiting downward movement of said piece. The finger-piece is slidable upwardly by the forefinger of the user's hand when grasping the pistol-grip handle 31.

The operation of the motor 10 is controlled by an on-off snap-switch and the speed of the motor is controlled by a resistance coil, and the inclusion of a varying number of convolutions of the coil in the motor circuit. The snap-switch comprises a resilient conductor strip 52 which is connected to a line-conductor 53, and a resilient conductor-strip 55, which normally engages a stop-strip 56. The other line conductor 54 is connected to the motor 10 as well understood in the art. Contact-strip 55 is movable into contact with strip 52 by an arcuate snap-member 58 which has one of its ends connected to the strip 55 and its other end connected to a resilient angular strip 59 constituting an over-center switch throw member. Strips 52, 55, 56 and 59 are insulated from one another, being supported by a clamp-bracket 61 of insulating material which is supported on a core 60 of insulating material. Bracket 61 is secured by screws 62 to core 60 and the latter is secured by a screw 63 to side-plate 42 of the pistol grip.

A rheostat or resistance coil 65 is wound around the core 60, and has one of its ends connected to conductor-strip 55 and its other end connected to a terminal plate 66 secured on core 60 which is connected by a conductor 67 to the motor 10. The wire of coil 65 is wrapped for insulation of its convolutions from one another and the portion of each convolution across the underside of the coil is bared for contact with a power regulating conductor comprising a resilient strip 69 of conductive material which also serves as an actuator for the snap-switch. The outer end of strip 69 is fixedly secured to the bracket 61. When the strip 69 is in its normal position, the full resistance of coil 65 will be included in the circuit between contact 55 and the terminal 66, for operating the motor at its lowest speed. When the finger-piece is moved upwardly, it will progressively flex strip 69 in greater degree. As the strip 69 is progressively flexed, it will short circuit an increased number of convolutions of the coil 65 while current passes via conductor 53, contact-strips 52, 55, member 58, strip 59 and strip 69, the remainder of the coil and terminal 66 to the motor. As the finger-piece is raised, the speed of the motor will be progressively increased. When the finger-piece 48 is shifted to its upper limit, strip 69 will engage terminal 66 and short circuit the entire coil, and the motor will be operated at its maximum speed. In this manner, the user can readily vary at will the speed of the motor and tools, while the appliance is maneuvered and grasped in one hand. When the finger-piece 48 is released, the resilient strip 69 will flex downwardly and retract the finger-piece to its normal position shown in Fig. 1 and release resilient strip 59. Strip 59 will then shift member 58 to open the switch at contacts 52 and 55, and stop the motor. The full resistance of coil 65 will be included in the motor circuit when the motor is next started.

In the use of the appliance, the operator will grasp the pistol grip in the palm of one hand and place his forefinger under the finger-piece 48. This grip enables the user to readily maneuver the mixing elements in material in a bowl. It is advantageous for the requirement of different work to rotate the tools at different speeds. The user presses the forefinger upwardly a distance proportionate to the speed desired. The initial upward movement of finger-piece 48 raises the strips 69 and 59 to pivot the snap member 58 through its dead center position relative to the contact strip 55 whereby the contact strip 55 is snapped into engagement with the conductor strip 52 to close the circuit for the motor with the resistance coil included therein. When an increase of speed is desired, the user will move the finger-piece upwardly still further to progressively short circuit convolutions of coil 65 by the shift strip 69 until the tool is being rotated at the desired speed. When the finger-piece is moved to its upper limit, current will pass from contact 52, via contact 55, member 58, strip 59 and strip 69 to terminal 66, the coil 65 will be short circuited and the motor will operate at its maximum speed. When the user releases the finger-piece 48, strip 69 will lower said piece to its normal position. The release strip 59 follows the downward movement of the strip 69 and acts through the snap member 48 to open the snap-switch and stop the motor 10.

The invention exemplifies an electrical appliance for operating tools in which the user can selectively control the starting and stopping of the motor and the speed of the tools while manually maneuvering the tools in the operation for different kinds of work. It also exemplifies an appliance of this type which can be conveniently grasped and manually maneuvered.

Having described my invention, what I claim as new and desire to secure by Letters Patent is:

1. A portable electric appliance for hand use comprising, in combination, a housing, an electric motor mounted within said housing and adapted to drive working elements journaled thereon, a pistol-type handle fixed to said housing and constituting a hand grip, said handle being of a hollow construction to define an internal control compartment disposed immediately within said hand grip, electrical conductors disposed within said control compartment and interconnected with said motor to form a segment of an electrical energizing circuit running therethrough, a coil type rheostat and an on-off snap switch disposed within said compartment and connected to said conductors in series with each other and in series with said circuit segment, a motor control trigger movably mounted on said appliance in proximate relation to said hand grip for convenient actuation by the hand of the operator used to grip said handle, power regulating conductor means disposed in said compartment in association with said rheostat, and said power regulating conductor means and said snap switch being operatively interconnected with said trigger whereby initial control movement of said trigger serves to throw said switch to closed position to effect a precise energization of said motor and continued control movement of said trigger actuates said power regulating conductor means to gradually decrease the effective electrical resistance of said rheostat in said circuit segment for speeding up said motor.

2. An electrically driven food mixer for hand use comprising, in combination, a housing, an electric motor mounted within said housing and adapted to drive mixing elements journaled thereon, a pistol-type handle fixed to said housing and constituting a hand grip, said handle being of a hollow construction to define an internal control compartment elongated longitudinally of said handle and disposed immediately within said hand grip, electrical conductors disposed within said control compartment and interconnected with said motor to form a segment of an electrical energizing circuit running therethrough, an elongated rheostat disposed longitudinally within said compartment to said conductors in series with said circuit segment, said rheostat including a succession of resistance coils connected in series but otherwise electrically insulated from each other, said coils being closely spaced along the elongated axis of said rheostat and being electrically exposed along one longitudinal side of the rheostat, a snap switch fixed within said handle compartment and having an over-center throw member disposed adjacent said rheostat, an elongated power regulating conductor having one end mounted at one end of said rheostat and extending across the exposed portions of said successive coils along said one longitudinal side of said rheostat, said regulating conductor from its supported to its free end being normally bowed progressively away from said coils, a motor control trigger movably mounted at the base end of said handle, the medial portion of said regulating conductor operatively engaging said switch throw member, and the free end of said regulating conductor being interconnected with said trigger so that initial inward movement of said trigger relative to said hand grip is yieldably transmitted to said throw member by said conductor to snap said switch into closed position to energize said motor and continued inward movement of said trigger in the same direction serves to progressively flatten said regulating conductor along said rheostat to gradually decrease the effective electrical resistance thereof for smoothly speeding up said motor.

3. An electrically driven food mixer for hand use comprising, in combination, a manually supportable housing having two opposite ends, means in one end of said housing for journaling at least one mixing element, an electric motor mounted in said housing for driving a mixing element mounted in said journaling means, a pistol type handle secured to one side of said housing and projecting laterally therefrom at the end of said housing remote from said journaling means, said handle constituting a hand grip and being of a hollow construction to define an internal control compartment elongated longitudinally of the handle and disposed immediately within said hand grip, electrical conductors extending into said control compartment and interconnected with said motor to form a segment of an electrical energizing circuit running therethrough, an elongated rheostat disposed within said compartment in longitudinal relation to said handle and connected in series with said conductors, said rheostat including a succession of resistance coils connected in series but otherwise insulated from each other, said coils being closely spaced longitudinally of said rheostat and electrically exposed along one longitudinal side thereof, a trigger movably mounted on said mixer adjacent the base of said handle in proximity to the housing end of said hand grip; an elongated power regulating member of resilient, electrically conducting material disposed longitudinally within said handle compartment and having one end mounted at the end of said rheostat remote from said housing; said regulating member from the mounted to the free end thereof extending along said one longitudinal side of said rheostat and being normally bowed progressively outward from the exposed portions of said successive coils, an on-off switch disposed within said handle compartment, said switch being mechanically connected to an intermediate portion of said regulating member and electrically connected to said conductors in series with said rheostat, and the free end of said regulating member being mechanically interconnected with said trigger to resiliently bias the latter outwardly relative to said hand grip, inward movement of said trigger from its outermost position by finger pressure applied thereto serving to sequentially close said switch to energize said motor and then flatten said regulating member progressively along said rheostat to regulate the motor speed; and said resilient regulating member upon slacking off of finger pressure on said trigger being self-acting to peel itself progressively out of contact with said successive rheostat coils, to move said trigger toward its outermost position, and to open said switch upon progression of the trigger member into its outermost position.

CLARK H. GEMMILL.

REFERENCES CITED

The following references are of record in the file of this patent:

UNITED STATES PATENTS

| Number | Name | Date |
| --- | --- | --- |
| 1,364,687 | Bentley | Jan. 4, 1921 |
| 1,489,182 | Weinberg | Apr. 1, 1924 |
| 1,827,372 | Riddell | Oct. 13, 1931 |
| 2,134,323 | Beach | Oct. 25, 1938 |
| 2,350,680 | Heintz | June 6, 1944 |
| 2,373,681 | Heikes | Apr. 17, 1945 |
| 2,406,389 | Lee | Aug. 27, 1946 |
| 2,414,043 | Honhart et al. | Jan. 7, 1947 |
| 2,485,278 | Gillman et al. | Oct. 18, 1949 |
| 2,525,839 | Sparklin | Oct. 17, 1950 |